June 16, 1953 E. W. SWANSON 2,642,327

SUPPORT FOR SOUND-REPRODUCING APPARATUS

Filed Jan. 9, 1947 2 Sheets-Sheet 1

INVENTOR
EDWARD W. SWANSON
BY
J. W. Douglas
ATTY.

SUPPORT FOR SOUND-REPRODUCING APPARATUS

INVENTOR.
EDWARD W. SWANSON
BY J. D. Douglas
ATTY.

Patented June 16, 1953 2,642,327

UNITED STATES PATENT OFFICE 2,642,327

SUPPORT FOR SOUND-REPRODUCING APPARATUS

Edward W. Swanson, Chicago, Ill., assignor to Admiral Corporation, Chicago, Ill., a corporation of Delaware Application January 9, 1947, Serial No. 721,025

11 Claims. (Cl. 312—8)

This invention relates to a support for a sound reproducing apparatus, and particularly to a support comprising mechanism by which apparatus such as a phonograph record player, normally supported in an inaccessible position within a cabinet, is shiftable to an accessible position for loading with or removal of records.

More specifically the invention comprehends novel mechanism, in combination with the cabinet and record player, through the agency of which the record player is shiftable; moreover, the features of the mechanism involve swingable links pivoted to the cabinet in novel association with each other to support the record player, and cushioning elements anchored to the links only, to overcome forces tending to urge the record player beyond predetemined accessible and/or inaccessible position as it is shifted from one to the other of these positions.

Although record players of the foregoing description are known to the phonograph art, the mechanism by which they are combined with their cabinets and by which they are capacitated to be shifted from one station to another station is intricate of structure and of large proportions. The cost of such mechanisms, being high, has contributed unduly to the high price of complete phonograph apparatuses. This is also true when the apparatuses are associated with a radio receiver and therewith housed in a cabinet commonly referred to by the trade as a console. Additionally, the mechanisms which were necessary to provide the cabinets with this feature were of cumbersome proportions necessitating, as a result, use of a large cabinet to house the music or sound reproductory apparatuses.

Due to my invention it is now possible to produce a radio cabinet having a record player incorporated therein which is shiftable between two stations, the same providing accessible and inaccessible positions for the record player, through the agency of mechanism which occupies less space, and which is less costly of manufacture than previously constructed mechanisms. Additionally, I am able to incorporate these features in a single cabinet which occupies less floor space and is of no greater height than the combination radio and record player cabinets of more conventional proportions.

In order that the foregoing advantages may be realized, novel mechanism is employed to shiftably anchor the record player to the cabinet. It involves use of a plurality of links at least one of which may be substantially straight, and a pair of links the members of which are of irregular formation and which include portions adapted to be swung through a quadrantal angle differing from the quadrantal angle through which the straight link or links are swingable. The irregular shaped links also include extensions which are bridged by a door through the agency of which the links, and consequently the record player, are adapted to be swung as said door is moved between closed and wide-open position.

Due to the angular spacing of the links, I am, therefore, able to provide means for alternate operation of a pair of cushioning elements anchored between complementary members of the links. This I achieve by providing movable anchorate points, for the cushioning elements, on a pair of the links, in spaced-apart, axial relationship to each other, and also provide movable anchorate points, for the other ends of cushioning elements, in coaxial relationship to each other on another link or pair of links, so as to enable the coaxial points to be swung about the other anchorate points and thus increase and decrease the distance between the coaxial points and one of the remaining points and/or the coaxial points and the other of the remaining points simultaneously, as the record player is shifted between its two stations.

Additionally, I provide adjustment elements to adjustably anchor the cushioning elements to the links so that the resistance, offered by said cushioning elements to forces tending to urge the record player beyond either of its positions, may be more effectively regulated, and thereby the possibility of shock at either of the stations minimized or completely obviated.

Other advantages of the invention will be apparent from the following specification when considered in conjunction with the accompanying drawings in which.

Figures 1, 2, 4:
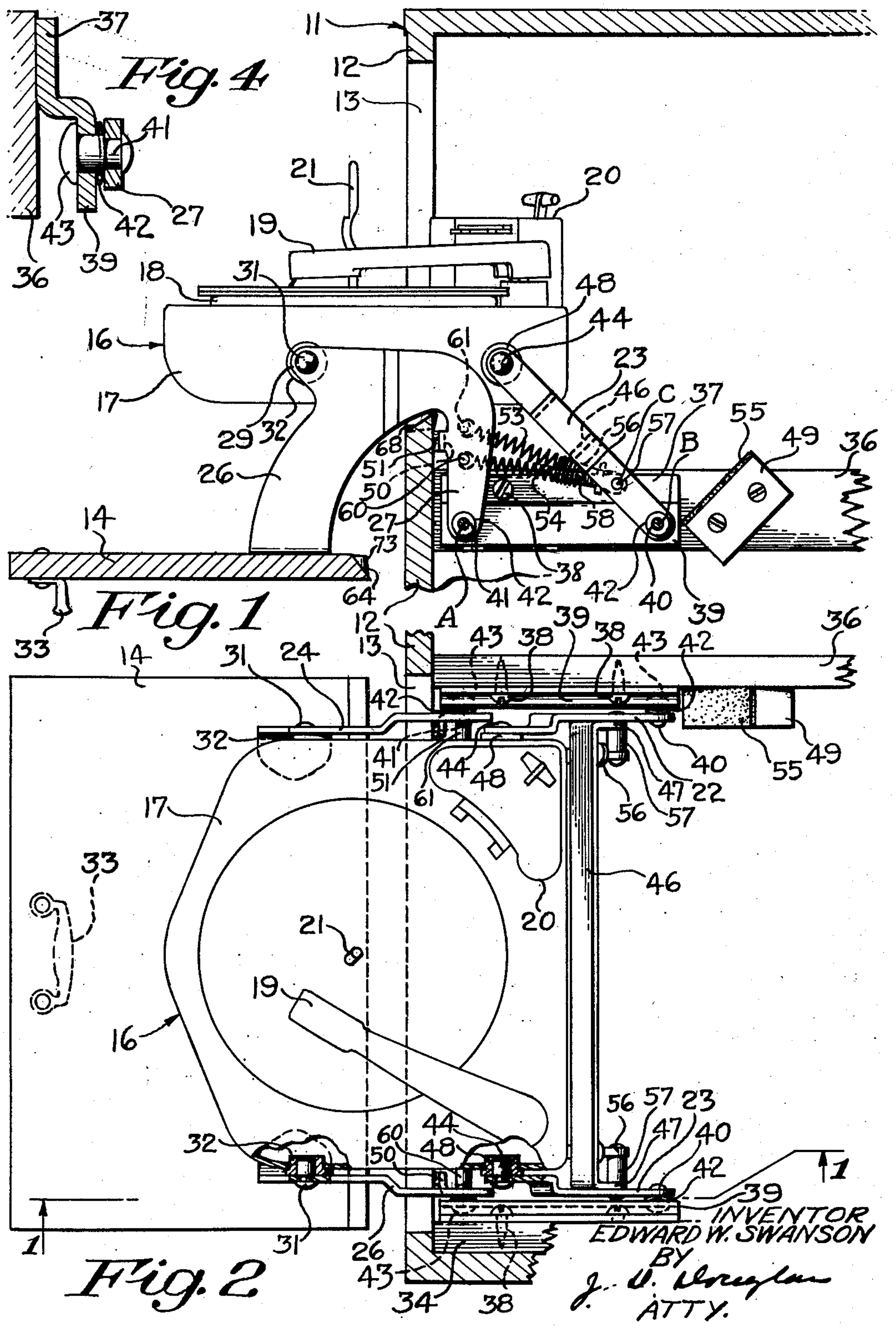
Fig. 1 is a view, taken on line 1—1 of Fig. 2, showing my invention as it is in conjunction with a cabinet and record player, in side elevation, the same being in accessible position.
Fig. 2 is a top plan view of the mechanism indicated in Fig. 1, parts being broken away to reveal the nature of other parts.
Fig. 4 is a vertical section taken on the line 4—4 of Fig. 3.
Figure 3:
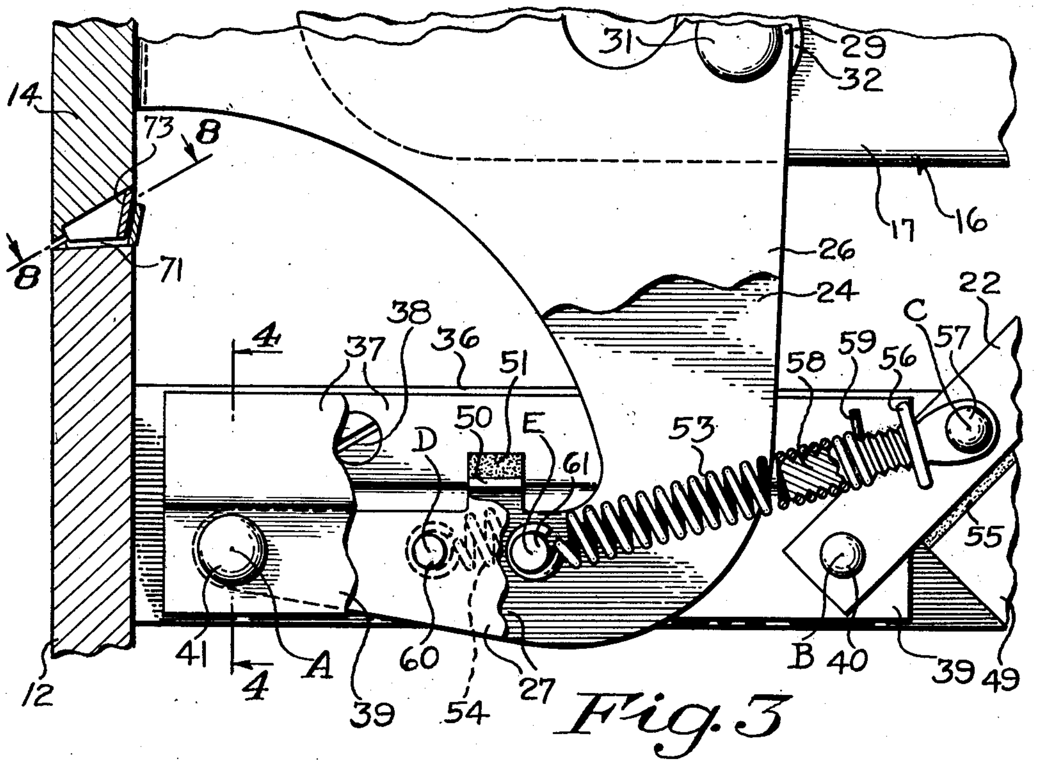
Fig. 3 is an elevational view, on an enlarged scale, corresponding to Fig. 1 but showing the door of the cabinet closed and the record player in its inaccessible position.

In Figs. 1 and 2, wherein for the purpose of illustration, is shown one embodiment of the invention, the reference character 11 is used to denote a cabinet such as one of the variety adapted to house a radio and phonograph apparatus and which is commonly known to the trade as a console style of cabinet. The cabinet includes a vertical front wall 12 in which is provided an opening 13, adapted to be closed by a door 14. The opening 13 is adapted to accommodate an automatic record player, which includes a shell or housing 17, turntable 18, pickup arm 19, ejector head 20, and spindle 21 is linked to the cabinet 11 and thus swingable between an accessible or extended position or station (Fig. 1) and an inaccessible or retracted position or station within the cabinet (Fig. 3).

In order that the record player 16 may be capacitated to swing between its two stations, a novel link mechanism is employed. It includes a pair of similar, straight links 22 and 23 and a pair of irregularly-shaped similar links 24 and 26, all of which are preferably struck from sheet metal. Both of the links 24 and 26 carry the door 14 from which they extend upwardly in an arcuate manner through the opening 13 (Fig. 1), beyond which they extend abruptly downward and terminate in substantially straight portions 27, the ends of which are adapted to pivot about an axis A, provided by means to be described hereinafter. Intermediate the ends thereof, the links 24 and 26 include ears 29 which bear shouldered pins 31, riveted to the ears and which extend inward toward each other on an axis common to both pins. The housing 17 is adapted to be supported by the ears 29 from which they are spaced slightly by bushings 32, carried by said housing, and in which the pins 31 are journaled. Additionally, the door carries a handle 33 by which said door may be swung about its axis A. By means of the handle the record player may be retracted to its inaccessible station where it is adapted to be concealed by the door 14 (Fig. 3), or extended to its accessible position for loading records thereon (Fig. 1), by opening the door.

Special means are employed to provide stationary support for the links. They include a pair of horizontal rails 34 and 36, integral with the cabinet, and a pair of plates 37, attached to the rails by screws 38. Longitudinally thereof, the lower portion of each of the plates 37 is offset to provide bearing portions 39 (Fig. 4), in spaced relationship to the rails. The links 24 and 26 carry shouldered pins 41, riveted thereto, and journaled in one end of the portions 39 on the axis A, while the links 22 and 23 carry shouldered pins 40, riveted thereto, and journaled in the other end of the portions 39 on an axis B which is parallel to and in substantially the same horizontal plane as the axis A. The links 22, 23, 24 and 26 are urged away from the plates 37 by means of spring washers 42, the force of which is resisted by heads 43 on the pins 40 and 41. By use of the washers I am able to compensate for space, and consequently play, between the links and plates 37, yet provide for adequate ease of rotation of the pins in their bearings.

It is essential that the record player be effectively supported by the links 22, 23, 24 and 26. For example, the record player must be constantly sustained in substantially horizontal position regardless of its location, to obviate possible release of records from the ejector head thereof at an undesired time. Therefore, the links 22 and 23 carry, in addition to th pins 40, a pair of shouldered pins 44, riveted to the links. The pins 40 and 44 are spaced from each other by a distance equal to the distance between pins 41 and 31 on the links 24 and 26. Additionally, the pins 44 are positioned on a common axis, and the links are tied together by a bridge or spacer bar 46, preferably struck from sheet metal, having L-shaped ends 47 held in rigid abutment with the links 24 and 26 in any convenient manner such as by spot welding. In addition, the links 22 and 23 embrace the sides of the casing 17 from which they are spaced slightly by bushings 48, carried by the casing, which also provide bearings for the pins 44.

Although I prefer to support the record player by two pairs of links, I also contemplate support of the record player by three links, two of the units of which being a pair to embrace opposed sides of the casing 17 and the third link pivoted to the casing substantially on a medial plane of the other two links.

Means are provided to control, within predetermined limits, the rearward swing of links 22, 23, 24 and 26. They include a stop 49 which is shown, conveniently fastened to the rails 34 and 36. The links 22 being adapted to swing against the stops 49 thus limit motion of the record changer inward to its inaccessible station. If desired, the blocks 49 may be surfaced at 55 with some shock absorbent material such as rubber, adapted to abut the interior of the cabinet when the record player is moved into its accessible position.

Means are provided to compensate for the inertia in the record player when it is moved to prevent shock, and especially when it is moved hurriedly toward either of its extreme positions. They include resilient means, preferably taking the form of tension springs 53 and 54, each of which is anchored at one end thereof to one of the links. Their effectiveness is dependent on the positions of the points on the links at which they are anchored. This is best indicated in Fig. 3. Therein, although the spring 53 only is shown in its entirety, both springs 53 and 54 are anchored to the links 22 and 23 at points provided by a pair of shouldered pins 57. Being in coaxial relationship to each other, the axis common to both pins 57 is carried with the links 22 and 23, and indicated by the character C. The axis C is substantially parallel to all the axes about which the links are adapted to swing.

An adjustable feature is employed to couple the springs 53 and 54 to the pins 57. It includes a pair of shouldered eye bolts 56 (Fig. 3) pivotally coupled to the links 22 and 23 by the pins 57. The springs 53 and 54, on the other hand, are coiled about threaded portions 58 of the eye bolts. No difficulty is encountered in screwing an eye bolt into one of the springs. This is due to the tendency which the bolt has to open, and consequently loosen, the spring about the threaded portion of the bolt. When, however, the body of the spring is held against rotation while an effort is made to unscrew the bolt therefrom, it will be found that the turning movement only increases the grasp of the spring on the eye bolt rendering its removal in this way difficult or impossible. Therefore, the convolutions of each of the springs 53 and 54 terminates in a free end portion 59, extending away from the eye bolt 56. On holding the springs against turning movement by grasping the portion 59, the bolt may be readily unscrewed from the spring.

The remaining ends of the springs 53 and 54 are coupled to the links 24 and 26 at movable anchorate points which are axially spaced apart and indicated by the letters D and E. The points are provided by annularly-grooved shoulder studs 60 and 61, riveted to the links 24 and 26. Each of the springs is anchored between adjacent links on opposite sides of the record player.

Tension in the springs 53 and 54 is alternately varied as the links 22, 23, 24 and 26 are swung between their extreme positions; that is, their positions when in engagement with either the stops 49 or when the stops 50 are in engagement with the cabinet. This is due to the manner in which the anchorate points, provided by pins 60 and 61 for the springs, are swung relative to each other. As will be noted (Fig. 3), the anchorate points provided by the pins 60 and 61 are in a horizontal plane with the four pins 40 and 41, when the links are swung as far as they will go clockwise. When the links are swung as far as the stops 50 permit them to go counterclockwise, the pins 60 and 61 are in a substantially vertical plane above the axis A. Therefore, it will be apparent that the anchorate points have been carried through an angle of substantially 90 degrees. At the same time, the axis C is also carried through an angle of 90 degrees as the links 22 and 23 are swung about the axis B, but the arms 27 of links 24 and 26 swing through a different quadrantal angle from the links 22 and 23 this being due to the fact that the original angle of inclination of the link 22—23 is different from that of the arms 27.

Figures 5, 6, 7, 8:
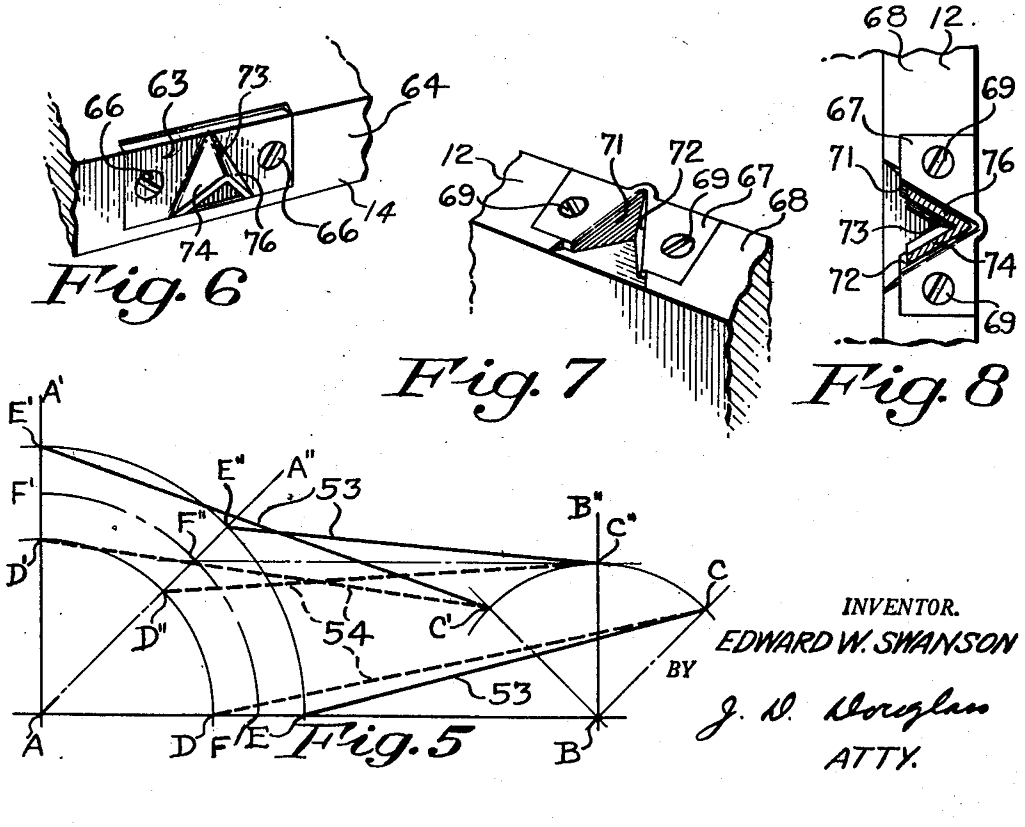
Fig. 5 is a diagram to indicate the manner in which the springs are alternately stretched and relaxed.
Fig. 6 is a view, in perspective, of one of the male guide members mounted on the door.
Fig. 7 is a view, in perspective, of the female guide member.
Fig. 8 is a section, taken on line 8—8 of Fig. 3.

For a better understanding of this, reference is made to Fig. 5 wherein a geometric figure is formed by locating points A, B, C, D and E by spacing them proportionately to the similarly designated axes in Fig. 3 and joining the points by lines, later to be referred to. In this way the substantial length of the spring 53 is represented by the line EC and spring 54 by the line DC, when the record player is in its extreme inward position, while line E'C' represents the length of spring 53 and line D'C' represents spring 54 when the record player is in its extreme outward position. If the lines EC and DC are regarded as the arms of a scalene triangle of which DE is the base and C the apex it will be apparent that said apex swings about the pivot point B, and the base the center of which is equidistant from the apex at either extreme position, swings about point A. This is because the pins 57, point C (Fig. 3), are adapted to be carried through angles of substantially 45 degrees on either side of a vertical drawn through the point B (Fig. 5) at which time the pins 60 and 61, corresponding to points D and E, are also carried from the horizontal line AB to the vertical line AA'.

The relationship between the radii BC, AD and AE will now be described. It will be most readily understood from a study of the triangle E''C''D'', corresponding to an instantaneous position that the links swing through when the record player is midway between its two extreme positions. In this position, the angle BAA'' is 45 degrees while the angle ABB'' is 90 degrees. If, now, a horizontal line be drawn through C'' it will intersect the line AA'' at F''. It will be noted that by this construction, the lines CF and C'F' at the end points of the swing, corresponding to line C''F'' at the midpoint of the swing, are of equal length while the line C''F'' is appreciably shorter. It now remains to space the points D'' and E'', on the line AA'', from the point F'', and by this method locate the pins 59 and 61 or points D and E. If the points D'' and E'' are spaced properly on opposite sides of the point F'' a point will be found where the spring 53 (line EC) will be elongated in passing from the extreme position of Fig. 3 (closed) to the extreme position of Fig. 1 (open), by an amount equal to the amount of contraction of spring 54 as it is carried from the Fig. 1 position to the Fig. 3 position. By positioning the points E'' and D'' in different spaced relationship from the point F'', a variation in the elongation and/or contraction of the springs may be achieved. If desired, this may be carried into effect since the spring 54 may be substantially longer than the spring 53; that is, when both springs are removed from their supports and are in a state of relaxation, or the springs may be of equal length and use of the shoulder bolts 56 made to effectively tension them. Regardless of the length of the springs, the provision for variably tensioning them is of advantage to compensate for both the weight of the record player itself and also the anticipated weight of the records with which it is to be loaded.

While I prefer to anchor both springs on a movable axis C, carried by the links 22 and 23, and to anchor the remaining ends of the springs on separate movable, spaced-apart points carried by the links 24 and 26, it is equally possible to anchor both springs on a single axis carried with the links 24 and 26, for example, at the point F (Fig. 5) in which event the remaining ends C of the links would be located on the vertical line BB'' on either side of the point C'' to afford equally effective alternate elongation and contraction of the springs. It is also within the purview of my invention to use a single spring where the loads would not be too great. In this event, the spring would preferably be located between points C and F to obtain the equal stretching described above. It is conceived, however, that the spring could be located elsewhere on either link to proportion the stretching differently between the opening and closing process.

If desired, some means for guiding the door 14 into the opening 13 may be employed. It preferably includes separate parts mounted on the door and one of the surfaces defining the opening for the door. The parts are adapted to cooperate well enough in case of maladjustment or accidental deflection of the links to enable the door to be thus drawn into substantial alignment with the opening so that the door can be closed and at the same time the record player shifted to its inaccessible position. A convenient expedient to obviate the possible exigencies may take the form of a metal guide plate 63 (Fig. 6) countersunk in the door 14, preferably at a point centrally of and flush with a bevelled edge 64 on the door, to which the plate may be fastened by screws 66. In addition, a striker plate 67 (Fig. 7) is also countersunk so that its surface is flush with a bevelled surface 68, defining the opening 13, screws 69 being employed to anchor the plate to its support, but the uniformity of the flat surface of plate 67 is interrupted by flat surfaces 71 and 72, inclined toward a plane, perpendicular of the plate, about which the planes are symmetrical.

The plate 63, on the other hand, is distended to provide a wedge-shaped extension 73 bounded by a pair of flat surfaces 74 and 76 which are symmetrical about a plane vertical of the plate 63, and complementary to the surfaces 71 and 72. Although the surfaces 71 and 72 (Fig. 8) are in close relationship to the surfaces 73 and 74 when the door is closed it will be apparent that should the door 14 be permanently displaced laterally as occasioned by a collision with the door of sufficient violence to bend the links slightly beyond their limit of elasticity so that thereafter the door would not normally close the opening, then as the door were moved toward closed position, it would first carry one of the inclined surfaces 74 or 76 against the complementary surfaces 71 or 72 on the plate 67. Then additional pressure to close the door being applied to the door, it would be shifted laterally by the mating, inclined surfaces which would guide the door to a position within the opening.

Although I have described details of a structure to illustrate one embodiment of my invention and used specific terms and language in so doing, it is to be understood that the present disclosure is illustrative rather than restrictive and that changes and modifications may be resorted to without departing from the spirit or scope of the claims appended hereto.

Having thus described my invention, I am aware that numerous and extensive departures may be made therefrom without departing from the spirit or scope of my invention.

I claim:

1. Phonograph apparatus of the class which includes a cabinet having an automatic record player therein which is swingable between an inaccessible station and an accessible station through the agency of a set of links pivoted to the record player and to the cabinet at points below said record player the swingability of which is affected by means comprising, stops on the cabinet, and a pair of tension springs connected to said links at anchorate points between the pivotal points on the cabinet and the record player about which the links are swingable, the position of the anchorate points for said springs being co-axial on one of said links and spaced apart on another of said links, providing for increasing tension alternately in said pair of springs as said record player is shifted toward one or the other of the stops.

2. Phonograph apparatus of the class which includes a cabinet having an automatic record player housed therein and having an opening in the cabinet to allow an accessible station and an inaccessible station between which the record player is swingable on links pivoted thereto at upper ends thereof and to the cabinet at lower ends of the same, and means to control motion of said record player comprising, a pair of springs on each side of said cabinet fixed to said links at points between the pivotal points of said links, at least one end of one spring of each of said pairs of springs being anchored to a link at a point spaced from the anchoring point on that link of the corresponding end of the other spring of that pair whereby one spring of each pair is relaxed as the other is tensioned while said record player is moved toward either of its stations, stop surfaces on the cabinet to define the limits of said stations, a door adapted to close the opening when the record player is in its inaccessible station, said door being also adapted to swing about the lower extremity of said opening and occupy a position below the record player when said record player is in its accessible station, and means including a pair of said links by which manual opening or closing of the door provides for swinging of the record player from one of its stations to the other of its stations.

3. Phonograph apparatus of the class which includes a cabinet in which an automatic record player is swingable between accessible and inaccessible stations through the agency of means comprising, a plurality of links pivoted to the record player and cabinet, a pair of cushioning elements anchored to said links, means providing a movable anchorate axis for one end of each of said elements in association with one of the links, and means providing a pair of movable anchorate points for the other ends of said elements, said pair of points being spaced apart on another of said links, said points and said axis being positioned to be carried through different quadrantal angles thereby providing a swingable relationship between said axis and said anchorate points for alternately deflecting each of said elements increasingly as the record player is moved toward either of its positions and thereby reduce shock thereat.

4. Phonograph apparatus of the class which includes a cabinet in which an automatic record player is swingable between accessible and inaccessible stations through the agency of means comprising a plurality of links pivoted to the record player and the cabinet, said links including at least one regular shaped link and a pair of irregular-shaped links, said irregular shaped links including a straight portion and a curvilinear portion, a door bridging the ends of said curvilinear portions to close the opening and convey manual motion to shift the record player, said straight portion and said regular-shaped link being swingable through different quadrantal angles, means providing a movable axis carried with one of the links, means providing movable anchorate points on a pair of the other links, said points being in fixed, spaced-apart, relationship to each other, a pair of resilient elements, one end of each of said elements being anchored to said anchorate points, the other ends of each element being anchored at said movable axis, the respective elements being adapted to be increasingly deflected as said links are swung toward extreme positions thereby resisting forces tending to urge the record player beyond its extended or retracted positions.

5. An apparatus of the class described comprising a record player, a cabinet for said record player, an opening in said cabinet through which the record player is movable between an accessible position and an inaccessible position within said cabinet, a door adapted to close said opening, a horizontal rail on either side of said opening and below the level thereof, a bearing plate carried by each of the rails, a pair of irregularly-shaped links to carry the door, a pair of straight links, pivotal means to couple an end of each of the links to said bearing plates, said pivotal means comprising a pin carried by each of said links, said plates providing bearings for said pins, heads on the pins to anchor the same to said plates, resilient elements to provide pressure engagement thereof with said plates and said links to compensate for space therebetween, second pivotal means to couple other parts of the links to said record player, said second pivotal means comprising pins on the links, bushings on the record player to provide bearings for said pins, said bushings being adapted to space the links from said record player, a pair of springs anchored between complementary members of pairs of the links, means on the links providing anchorate points for the springs, a pair of said points being coaxial to each other and another pair being in axial spaced-apart relationship to each other, and means providing for simultaneous alternate deflection of the springs by virtue of a swingable relationship between said points to reduce shock of the record player as it is moved toward either its accessible or inaccessible position.

6. An aparatus of the class described comprising a record player, a cabinet for said record player, an opening in said cabinet through which the record player is movable to an accessible position from an inaccessible position within said cabinet, a door adapted to close said opening, a horizontal rail on either side of said opening and below the level thereof, a bearing plate carried by each of the rails, a pair of irregularly shaped links to carry the door, a pair of straight links, a bridge between said straight links, pivotal means to couple an end of each of the links to said bearing plates, said pivotal means comprising a pin carried by each of said links, said plates providing bearings for said pins, heads on the pins to anchor the same to said plates, resilient elements to provide pressure engagement thereof with said plates and said links to compensate for space therebetween, second pivotal means to couple other parts of the links to said record player, said second pivotal means comprising pins on the links, the pins at said record player being in one horizontal plane and the pins at said bearing plate being in another horizontal plane, bushings on the record player to provide bearings for the pins, means to guide the door into the opening comprising, a V-shaped lug member, a V-shaped groove member, said V-shaped members having surfaces complementary to each other, one of said members being carried by the cabinet and the other members being carried by said door, a pair of springs anchored between complementary members of pairs of the links, means on the links to provide anchorate points for the springs, a pair of said anchorate points being coaxial to each other on one pair of links, said coaxial points being in a plane with the pins carried by that pair of links, and means providing anchorate points on each of the members of the other pair of links, said points being in spaced-apart axial relationship, said spaced-apart points lying in a transverse plane angularly displaced from the transverse plane defined by the pins carried by said other pair of links, said spaced-apart points being on radii different from the radius on which the coaxial points are swingable to provide for alternate tensioning of the springs as the record player is swung toward accessible or inaccesible positions thereby resisting shock at said positions.

7. In combination with a movable support for a device, which comprises pairs of links pivotally secured at one end to an unmoving member, and means supported by the other ends of said links for movement between alternate positions when the links are moved and tieing said moving ends of said links together; cushioning means for cushioning the movement of said links when they are swung toward the ends of their pivotal movement comprising springs in pairs, each pair of springs secured at one end to one of said pairs of links on a common axis and being respectively connected at their other ends to the other of said links on axes spaced from each other and from the pivot point of said other link, and adjustable means connecting between at least one end of said springs and said links for varying the tension on the links.

8. In combination with a movable support for a device, which comprises pairs of links pivotally secured at one end to an unmoving member, means supported by the other ends of said links for movement between alternative positions when said links are moved, one link of each pair adapted to be swung in one plane and the other link of each pair in a spaced parallel plane, means supported by the movable ends of said links for movement between alternate positions when the links are swung, means tieing at least one pair of links rigidly together, cushioning means for cushioning the movement of said links when they are swung toward the ends of their pivotal movement comprising at least one pair of springs, each pair of springs secured at one end to one of said pairs of links on a common axis and being respectively connected at their other ends to the other of said links on axes spaced from each other and the pivot point of said other links.

9. A movable support for a device, comprising pairs of links pivotally secured at one end to an unmoving member, means supported by the other ends of said links for movement between alternative positions when said links are moved, cushioning means for cushioning the movement of said links when they are swung toward either ends of their pivotal movement comprising a pair of springs, each spring being connected at one end to one of a pair of said links at a point on a line between the pivot points of said link, the other end of each spring being connected to one of the other pair of said links at a point on a line through the fixed pivot point but angularly displaced from a line through both pivot points of that link so that said springs will each alternately be extended from its minimum length at both said alternative positions.

10. A movable support for a device, comprising pairs of links pivotally secured at one end to an unmoving member, means supported by the other ends of said links for movement between alternative positions when said links are moved, cushioning means for cushioning the movement of said links when they are swung toward either end of their pivotal movement comprising a pair of springs, each spring being connected at one end to one of a pair of said links at a point on a line between the pivot points of said link, the other end of each spring being connected to one of the other pair of said links at a point on a line through the fixed pivot point but angularly displaced from a line through both pivot points of that link and at a distance from said fixed pivot point such that the extension of said spring will be a minimum at the center of the swing of said links and a maximum and equal at the end points of said swing.

11. Phonograph apparatus of the class which includes a cabinet having an aperture through which an automatic record player is swingable between accessible and inaccessible stations through the agency of means comprising a plurality of links pivoted to the record player and the cabinet, a door, said links including an angle shaped pair having an extending portion to support the door by which said aperture is adapted to be closed and by which the record player is adapted to be shifted, said links also including a regular-shaped link, means providing movable anchorate points on the members of the angle shaped links, said points being in fixed, spaced-apart, relationship to each other, a pair of resilient elements, one end of each of said pair of elements being anchored to said points on the links, the other end of each element of said pair being anchored to said regular link, one of said elements being adapted to resist forces tending to urge the record player beyond its extended position and the other of said elements being adapted to resist forces tending to urge said record player beyond its retracted position.

EDWARD W. SWANSON.

References Cited in the file of this patent

UNITED STATES PATENTS

| Number | Name | Date |
|---|---|---|
| 575,602 | Gramelspacher | Jan. 19, 1897 |
| 801,880 | Kauffman | Oct. 17, 1905 |
| 1,397,850 | Yoxall et al. | Nov. 22, 1921 |
| 1,585,574 | Thompson | May 18, 1926 |
| 1,768,459 | Wells | June 24, 1930 |
| 1,867,676 | Mueller | July 19, 1932 |
| 2,125,989 | Burch | Aug. 9, 1938 |
| 2,245,526 | Fox | June 10, 1941 |
| 2,296,950 | Roedl | Sept. 29, 1942 |
| 2,358,917 | Emde | Sept. 26, 1944 |
| 2,447,572 | Emde | Aug. 24, 1948 |